United States Patent
Park et al.

(10) Patent No.: US 9,741,170 B2
(45) Date of Patent: Aug. 22, 2017

(54) METHOD FOR DISPLAYING AUGMENTED REALITY CONTENT BASED ON 3D POINT CLOUD RECOGNITION, AND APPARATUS AND SYSTEM FOR EXECUTING THE METHOD

(71) Applicant: MAXST CO., LTD., Seoul (KR)

(72) Inventors: Jae Wan Park, Seoul (KR); Seung Gyun Kim, Seoul (KR); Gi Seok Kwon, Incheon (KR)

(73) Assignee: MAXST CO., LTD., Seoul (KR)

( * ) Notice: Subject to any disclaimer, the term of this patent is extended or adjusted under 35 U.S.C. 154(b) by 71 days.

(21) Appl. No.: 14/723,704

(22) Filed: May 28, 2015

(65) Prior Publication Data

US 2016/0343165 A1 Nov. 24, 2016

(30) Foreign Application Priority Data

May 21, 2015 (KR) ........................ 10-2015-0070875

(51) Int. Cl.
| | |
|---|---|
| *G09G 5/00* | (2006.01) |
| *G06T 19/00* | (2011.01) |
| *G06K 9/00* | (2006.01) |
| *G06K 9/62* | (2006.01) |

(52) U.S. Cl.
CPC ........ *G06T 19/006* (2013.01); *G06K 9/00671* (2013.01); *G06K 9/6255* (2013.01)

(58) Field of Classification Search
None
See application file for complete search history.

(56) References Cited

U.S. PATENT DOCUMENTS

| | | | |
|---|---|---|---|
| 2008/0095402 A1* | 4/2008 | Kochi | G01C 11/00 382/103 |
| 2008/0181487 A1* | 7/2008 | Hsu | G06K 9/3241 382/154 |

FOREIGN PATENT DOCUMENTS

| | | |
|---|---|---|
| JP | 2007-278844 A | 10/2007 |
| JP | 2010-061375 A | 3/2010 |

(Continued)

OTHER PUBLICATIONS

Bae et al. (A Closed-Form Expression of the Positional Uncertainty for 3D Point Clouds, IEEE, vol. 32, No. 4, Apr. 2009).*

(Continued)

*Primary Examiner* — Kyle Zhai
(74) *Attorney, Agent, or Firm* — The PL Law Group, PLLC

(57) ABSTRACT

An augmented reality content display method and an apparatus and system for performing the same are disclosed. The method includes extracting, by a feature point classification device, feature points from a plurality of images captured while changing a capture point such that at least one of a capture position and a capture orientation is changed, tracking, by the feature point classification device, feature points extracted from the same area of the plurality of images to associate the tracked feature points with one another, calculating, by the feature point classification device, uncertainty about a position of the associated feature points, and classifying and storing, by the feature point classification device, the associated features as a recognition reference feature point group or a dummy feature point group according to the position uncertainty.

11 Claims, 5 Drawing Sheets

(56) References Cited

FOREIGN PATENT DOCUMENTS

JP       2014-026555 A    2/2014
KR   10-2014-0030444 A    3/2014

OTHER PUBLICATIONS

Lalonde et al. (Scale selection for classification of point-sampled 3D surfaces, IEEE, 2005).*
Lee et al. (Hybrid Feature Tracking and User Interaction for Markerless Augmented Reality, IEEE, 2008).*
Office action issued on Apr. 15, 2016 from Korean Intellectual Property Office in a counterpart Korean Patent Application No. 10-2015-0070875.
Notice of Allowance issued on Mar. 23, 2017 from Korean Intellectual Property Office in a counterpart Korean Patent Application No. 10-2015-0070875.

* cited by examiner

METHOD FOR DISPLAYING AUGMENTED REALITY CONTENT BASED ON 3D POINT CLOUD RECOGNITION, AND APPARATUS AND SYSTEM FOR EXECUTING THE METHOD

CROSS-REFERENCE TO RELATED APPLICATION

This application claims priority to and the benefit of Korean Patent Application No. 10-2015-0070875, filed on May 21, 2015, the disclosure of which is incorporated herein by reference in its entirety.

BACKGROUND

1. Field

The present disclosure relates to an augmented reality technique.

2. Discussion of Related Art

Along with the popularization of smartphones or the like in recent years, an augmented reality technique has been widely utilized in various fields. Examples of the augmented reality technique may include a technique of sensing an augmented reality marker from an image captured by a camera, combining a virtual object with the image according to the sensed marker, and outputting the combined image. By using the technique, a virtual character that is not present in the real world may be displayed on a screen as if the character exists in the real world.

Recently, research has been conducted on a markerless-based augmented reality technique that does not need a marker and can recognize a specific object. The markerless-based augmented reality technique includes the extraction of feature points of an object in the real world and the recognition of the object based on the extracted feature points. However, when a 3 dimensional object is recognized, an amount of data increases. Thus, the markerless-based augmented reality technique has difficulties in implementing augmented reality in real time.

SUMMARY

The present disclosure is directed to a method for displaying augmented reality content and an apparatus and system for performing the method in which the amount of data to be processed can be reduced and augmented reality can be implemented in real time.

The present disclosure is also directed to a method for displaying augmented reality content and an apparatus and system for performing the method in which accuracy in object recognition can be enhanced.

According to an aspect of the present disclosure, there is provided an apparatus including: one or more processors; a memory; and one or more programs, wherein the one or more programs are stored in the memory and configured to be executed by the one or more processors, the one or more programs including instructions for: extracting feature points from a plurality of images captured while changing a capture point such that at least one of a capture position and a capture orientation is changed; tracking feature points extracted from the same area of the plurality of images to associate the tracked feature points with one another; calculating uncertainty about a position of the associated feature points; and classifying the associated feature points according to the position uncertainty.

The classifying of the feature points may include classifying the associated feature points as a recognition reference feature point group or a dummy feature point group according to the position uncertainty.

The position uncertainty may be calculated according to a linearity index computed among the associated feature points of the plurality of images.

The classifying of the feature points may include classifying the associated feature points as the recognition reference feature point group when the linearity index is equal to or less than a predetermined threshold value and classifying the associated feature points as the dummy feature point group when the linearity index is greater than the predetermined threshold value.

The method may further include calculating coordinates of the feature points classified as the recognition reference feature point group.

The tracking of feature points to associate the tracked feature points with one another may include excluding feature points extracted from an area, in which the same or similar pattern being repeated, of the plurality of images from among tracking targets.

According to another aspect of the present disclosure, there is provided a method for displaying an augmented reality content including: extracting, by a feature point classification device, feature points from a plurality of images captured while changing a capture point such that at least one of a capture position and a capture orientation is changed; tracking, by the feature point classification device, feature points extracted from the same area of the plurality of images to associate the tracked feature points with one another; calculating, by the feature point classification device, uncertainty about a position of the associated feature points; and classifying and storing, by the feature point classification device, the associated features as a recognition reference feature point group or a dummy feature point group according to the position uncertainty.

The position uncertainty may be calculated according to a linearity index computed among the associated feature points of the plurality of images.

The classifying and storing of the associated features may include classifying the associated feature points as the recognition reference feature point group when the linearity index is equal to or less than a predetermined threshold value and classifying the associated feature points as the dummy feature point group when the linearity index is greater than the predetermined threshold value.

The method may further include, after the classifying and storing of the associated features, extracting, by an object recognition device, feature points from an image obtained by a capture device capturing a certain object; extracting, by the object recognition device, prestored feature points matched with the extracted feature points to recognize the object; acquiring, by an augmented reality display device, augmented reality content corresponding to the recognized object; and combining, by the augmented reality display device, the acquired augmented reality content with the image obtained by capturing the object to display the combined augmented reality content.

Information regarding coordinates of each feature point belonging to the recognition reference feature point group may be prestored, and the extracting, by the object recognition device, of prestored feature points matched with the extracted feature points to recognize the object may include: extracting, by the object recognition device, the feature points matched with the extracted feature points from among the recognition reference feature point group; and extracting, by the object recognition device, coordinates of the feature points extracted from among the recognition reference feature point group to calculate an initial orientation of the capture device using the extracted coordinates.

The combining, by the augmented reality display device, the acquired augmented reality content with the image obtained by capturing the image to display the combined augmented reality content may include adjusting, by the augmented reality display device, a orientation of the augmented reality content using an initial orientation of the capture device to combine the augmented reality content with the image obtained by capturing the object.

The method may further include, after the combining, by the augmented reality display device, the acquired augmented reality content with the image obtained by capturing the image to display the combined augmented reality content, readjusting, by the augmented reality display device, a orientation of the augmented reality content according to the changed capture point when the capture point of the capture device is changed.

According to an aspect of the present disclosure, there is provided a system configured to extract feature points from a plurality of images captured while changing a capture point such that at least one of a capture position and a capture orientation is changed for each object, tracking feature points from the same area of the plurality of images to associate the tracked feature points with one another, and classify and store the associated feature points as a recognition reference feature point group or a dummy feature point group according to uncertainty about a position of the associated feature points, the system including: a capture device configured to capture the object; an object recognition device configured to extract feature points from an image obtained by the capture device capturing the object and extract prestored feature points matched with the extracted feature points to recognize the object; and an augmented reality display device configured to acquire augmented reality content corresponding to the recognized object, combine the augmented reality content with the image obtained by capturing the object, and display the combined augmented reality content.

Information regarding coordinates of each feature point belonging to the recognition reference feature point group may be prestored, and the object recognition device may extract the feature points matched with the extracted feature points from among the recognition reference feature point group, extract coordinates of the feature points extracted from among the recognition reference feature point group, and calculate an initial orientation of the capture device using the extracted coordinates.

The augmented reality display device may adjust an orientation of the augmented reality content using an initial orientation of the capture device to combine the augmented reality content with the image obtained by capturing the object and may readjust the orientation of the augmented reality content as a capture point of the capture device is changed.

The system may further include a feature point classification device configured to extract feature points from a plurality of images captured while changing a capture point such that at least one of a capture position and a capture orientation is changed for each object; track feature points extracted from the same area of the plurality of images to associate the tracked feature points with one another; and classify the associated features as a recognition reference feature point group or a dummy feature point group according to uncertainty about a position of the associated feature points.

The position uncertainty may be calculated according to a linearity index computed among the associated feature points of the plurality of images.

The feature point classification device may classify the associated feature points as the recognition reference feature point group when the linearity index is equal to or less than a predetermined threshold value and classify the associated feature points as the dummy feature point group when the linearity index is greater than the predetermined threshold value.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, embodiments of the present disclosure will be described in detail with reference to the accompanying drawings. The following detailed description is provided for better understanding of a method, an apparatus, and/or a system that are disclosed in this specification. However, this is merely exemplary, and the present disclosure is not limited thereto.

In describing embodiments of the present disclosure, when it is determined that detailed description of known techniques associated with the present disclosure would unnecessarily obscure the gist of the present disclosure, the detailed description thereof will be omitted. Also, the terms described below are defined in consideration of the functions in the present disclosure, and thus may vary depending on a user, intention of an operator, or custom. Accordingly, the terms will be defined based on the whole specification. The terminology used herein is for the purpose of only describing embodiments of the present disclosure, and is not intended to be restrictive. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

In the following description, the terms "transfer," "communication," "transmission," "reception," or the like indicate that a signal or information is transferred from one element to another element directly or through intervening elements. In particular, when a signal or information is referred to as being "transferred" or "transmitted" to one element, the element indicates a final destination rather than a direct destination. This may also be applied to a case in which the signal or information is "received." In the present specification, when two pieces of data or information are referred to as being "associated" with one another, this indicates that, if a piece of data (or information) is acquired, at least other pieces of data (or information) may be acquired based on the association.

Figure 1:
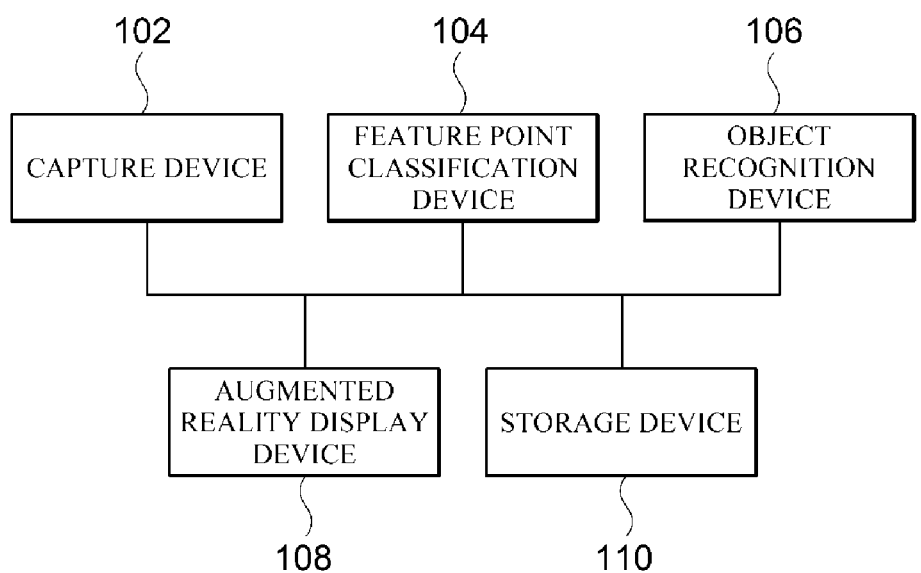
FIG. 1 is a block diagram illustrating an object-recognition-based augmented reality system according to an exemplary embodiment.

FIG. 1 is a block diagram illustrating an object-recognition-based augmented reality system according to an exemplary embodiment.

A method of an augmented reality system 100 shown in FIG. 1 for combining augmented reality content with an image including a predetermined object and outputting the combined augmented reality content is described as follows. 1) The augmented reality system 100 extracts feature points from an image obtained by capturing an object that is subject to the augmented reality service, classifies the extracted feature points, and prestores the classified feature points. In this case, the classified feature points are matched with the corresponding object and stored. The stored feature points are used in 2) to recognize what the captured object is. In an exemplary embodiment, in order to accurately recognize a 3-dimensional (3D) object, the augmented reality system 100 may capture the object in several directions, extract feature points of the object from images obtained by capturing the object, and classify the extracted feature points. 2) The augmented reality system 100 captures a certain object, extracts feature points from an image obtained by capturing the object, and checks prestored feature points that match the extracted feature points to recognize the object. 3) The augmented reality system 100 extracts augmented reality content corresponding to the recognized object, combines the extracted augmented reality content with the image obtained by capturing the object, and displays the combined augmented reality content. In an exemplary embodiment, the augmented reality content (or augmented reality object) is an object that is combined with an image and then output and may include, for example, a 3D virtual object.

Referring to FIG. 1, the augmented reality system 100 may include a capture device 102, a feature point classification device 104, an object recognition device 106, an augmented reality display device 108, and a storage device 110.

The components of the augmented reality system 100 may be included in one computing apparatus. The computing apparatus may be, for example, a mobile phone, a smartphone, a tablet, a laptop, a desktop, and a wearable device such as a smart watch. At least two of the components of the augmented reality system 100 may be included in one computing apparatus. For example, the capture device 102 and the feature point classification device 104 may be included in one computing apparatus. Alternatively, the capture device 102, the object recognition device 106, and the augmented reality display device 108 may be included in one computing apparatus. At least one component of the augmented reality system 100 may be connected with at least one other component through a network (e.g., a cellular network, an Internet network, an Ethernet network, a local area network, a wide area network).

The capture device 102 serves to capture a certain object positioned in front thereof to generate an image including the object. The image may be a moving image or a still image. The capture device 102 may include at least one camera module. The capture device 102 may capture the object while changing at least one of a capture position and a capture orientation. That is, the capture device 102 may capture the object while changing a position of the capture device 102, a focus of the capture device 102, or a zoom of the capture device 102. Alternatively, the capture device 102 may capture the object while changing an orientation (e.g., a pitch, a roll, a yaw, etc.) of the capture device 102. That is, the capture device may capture the object while changing a capture point such that at least one of the capture position and the capture orientation is changed. The capture device 120 may generate a plurality of images that are captured while changing at least one of a capture position and capture orientation of one object. The plurality of images may be generated sequentially.

The feature point classification device 104 may extract feature points from an image obtained by capturing an object that is subject to an augmented reality service and classify, in advance, the feature points to be used or unused for object recognition. For example, among feature points extracted from an image obtained by capturing a certain object, the feature point classification device 104 may classify only feature points having distance (position) certainty equal to or higher than a certain level as a feature point to be used (that is, a recognition reference feature point). On the contrary, among feature points extracted from an image obtained by capturing a certain object, the feature point classification device 104 may classify feature points having distance (position) certainty lower than a certain level as a feature point not to be used (that is, a dummy feature point). The feature point classification device 104 may match and store the feature points classified for each object and the object in the storage device 110.

The object recognition device 106 may extract feature points from an image including a certain object and check the prestored feature points that match the extracted feature points to recognize a corresponding object (that is, recognize what the corresponding object is). In this case, since a check for a corresponding pair is performed on only the feature points having distance (position) certainty equal to or higher than a predetermined threshold value, it is possible to reduce an amount of data to be processed while recognizing a 3D object (thing).

The augmented reality display device 108 may acquire augmented reality content corresponding to the object recognized by the object recognition device 106. The augmented reality display device 108 may combine the acquired augmented reality content with the image including the object to generate and display an augmented reality image. The augmented reality display device 108 may acquire the augmented reality content from the storage device 110. However, the present disclosure is not limited thereto, and the augmented reality display device 108 may receive augmented reality content corresponding to the object from the outside through a network. The augmented reality display device 108 may update the augmented reality image whenever a capture point of the capture device 102 is changed.

The storage device 110 may match and store information regarding feature points classified by the feature point classification device 104 and a corresponding object. The storage device 110 may store augmented reality content corresponding to each object. The storage device 110 may be a physical storage space such as a hard disk or memory of the computing apparatus. However, the present disclosure is not limited thereto, and the storage device 110 may include local storage such as direct attached storage (DAS), network storage such as network attached storage (NAS) or a storage area network (SAN), cloud storage, or other various types of storage.

Figure 2:
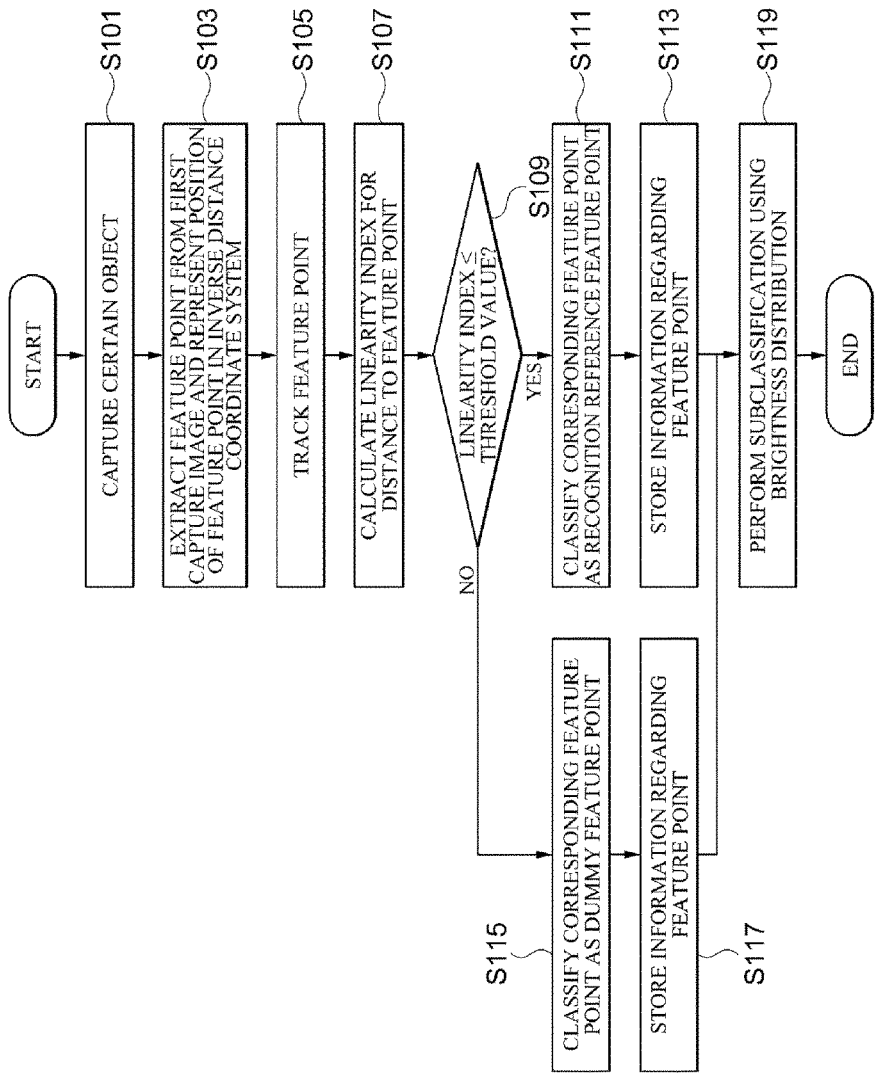
FIG. 2 is a flowchart showing a process of a feature point classification device classifying feature points according to an exemplary embodiment.

FIG. 2 is a flowchart showing a process of a feature point classification device classifying feature points according to an exemplary embodiment. In the flowchart, the method is illustrated as having a plurality of steps. However, at least some of the steps may be performed in a different order, performed in combination, omitted, performed in sub-steps, or performed in addition to one or more steps that are not shown. Furthermore, according to an embodiment, one or more steps that are not shown may be performed in addition to the method.

Referring to FIG. 2, the capture device 102 captures a certain object to generate an image including the object (S101). The capture device 102 may capture the object while changing a capture point from a first capture point to an nth capture point. The first to nth capture points may be different from one another in at least one of a position and orientation of the capture device 102. That is, since the object is generally a 3D object in an actual environment, the object may be captured in several capture positions and capture orientations. An image obtained by capturing the object may be transmitted to the feature point classification device 104.

Next, the feature point classification device 104 extracts feature points from an image obtained by capturing the object at a first capture point (that is, first capture image) and represents positions of the extracted feature points in an inverse distance coordinate system (S103). The feature point classification device 104 may generate feature point descriptors for the extracted feature points. Methods of extracting feature points and generating feature point descriptors may be executed in various well-known techniques.

Figure 3:
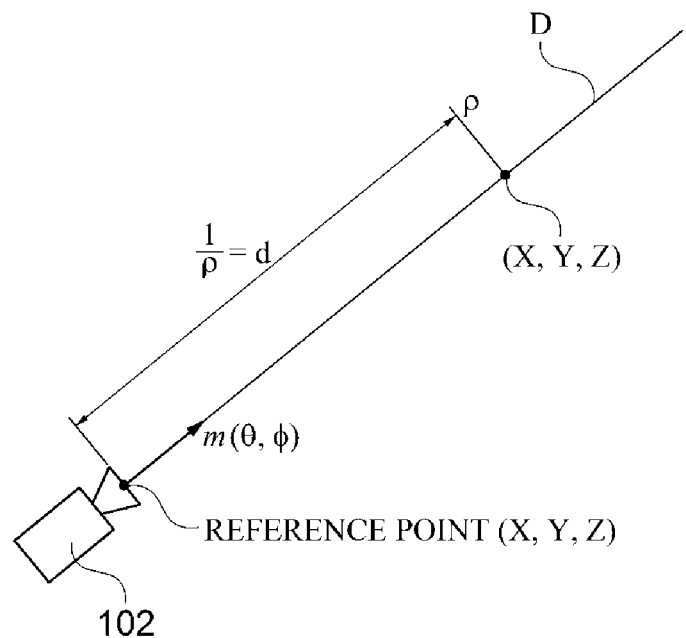
FIG. 3 is a view for describing an inverse distance (depth) coordinate system according to an exemplary embodiment.

FIG. 3 is a view for describing an inverse distance (depth) coordinate system according to an exemplary embodiment. Here, for the convenience of description, one feature point P extracted from an image is described.

Referring to FIG. 3, according to the inverse distance coordinate system, a position of the feature point P may be represented using a reference point (x, y, z) indicating the coordinates of the capture device 102, a direction from the capture device 102 to the feature point P, and a distance from the capture device 102 to the feature point P. The reference point (x, y, z) includes coordinates of the capture device 102 according to a local coordinate system of an area in which the capture device 102 is positioned. The reference point (x, y, z) may include coordinates of a center point of the capture device 102. Coordinates (X, Y, Z) of the feature point P may be expressed using Equation (1) below:

$$\begin{pmatrix} X \\ Y \\ Z \end{pmatrix} = \begin{pmatrix} x \\ y \\ z \end{pmatrix} + \frac{1}{\rho} m(\theta, \phi) \quad (1)$$

where ρ is an inverse distance, and 1/ρ is a distance from the reference point (x, y, z) to the feature point P. m(θ, φ) is a vector (that is, a direction vector) from the reference point (x, y, z) to the feature point P.

Since the feature point P is extracted from the image captured by the capture device 102, 1/ρ indicating a distance from the reference (x, y, z) to the feature point P includes uncertainty. When a line D is drawn from the reference point (x, y, z) to the feature point P, it can be seen that the feature point P is positioned on the line D, but a position of the feature point P on the line D (that is, a distance from the reference point (x, y, z) to the feature point P) can only be probabilistically expressed (e.g., as a Gaussian distribution) because the image captured by the capture device 102 is represented as a 2D plane. Accordingly, 1/ρ indicating the distance from the reference (x, y, z) to the feature point P includes a certain degree of uncertainty.

Next, the feature point classification device 103 tracks whether images obtained by capturing the object at other capture points after the first capture point have the feature points of the first capture image (S105). For example, the feature point classification device 104 may extract feature points from the images obtained by capturing the object at other capture points after the first capture point and check whether there are feature points corresponding to the feature points of the first capture image to track the feature points of the first capture image. That is, the feature point classification device 104 may associate feature points extracted from a predetermined area of the first capture image with feature points extracted from corresponding areas of other capture images after the first capture image.

The feature point classification device 104 may exclude feature points extracted from an area, in which the same or similar patterns are repeated, of the capture image from among tracking targets. That is, since the feature points extracted from the area, in which the same or similar patterns are repeated, of the capture image are similar to one another and thus are difficult to track or recognize, the feature points may be excluded in advance from among the tracking targets. Thus, it is possible to prevent in advance a corresponding feature point from interfering with tracking or recognition of other feature points and reduce an amount of data to be processed.

Next, the feature point classification device 104 calculates distance (position) uncertainty of the tracked feature point (S107). Here, the distance uncertainty of the tracked feature point may be calculated using a linearity index Lρ represented by Equation (2) below. That is, the distance uncertainty of the certain feature point may be calculated according to a linearity index that is computed among feature points that are associated with one another through the feature point tracking. For the convenience of description, a case in which a feature point P0 is extracted from a certain area of the first capture image and a feature point P1 associated with the feature point P0 is extracted from a certain area of the second capture image will be described.

$$L_\rho = \frac{4\sigma_\rho}{\rho_0} \left| 1 - \frac{d_0}{d_1} \cos\alpha \right| \quad (2)$$

where 1/ρ0 and $d_0$ are a distance from a reference point of the capture device 102 to the feature point P at the first capture point. $d_1$ is a distance from a reference point of the capture device 102 to the feature point P at the second capture point. α is an angle among a direction in which the capture device 102 is facing at the first capture point and a direction in which the capture device 102 is facing at the second capture point. $\sigma_\rho$ is a Gaussian distribution of an inverse distance.

Next, the feature point classification device 104 may determine whether the linearity index computed among the feature points that are associated with one another through the feature point tracking is equal to or less than a predetermined threshold value (S109). When the linearity index is equal to or less than the predetermined threshold value, this may indicate that the certainty about the distance to (position of) the feature point is equal to or greater than a certain level.

Here, a distance uncertainty of a feature point extracted from a certain area of the first capture image is lower than a distance uncertainty of a feature point extracted from a corresponding area of the second capture image. That is, it is assumed that the capture device 102 captures an object in the order of the first capture point, the second capture point, . . . , and the nth capture point. Under a condition that the feature point classification device 104 sequentially tracks a feature point extracted from a certain area of the first capture image in corresponding areas of the second capture image, the third capture image, . . . , and the nth capture image, the uncertainty about the distance to the feature point decreases from the second capture image to the nth capture image.

When a result of the determination in step S109 is that a linearity index computed among feature points associated with one another through the feature point tracking is equal to or less than the predetermined threshold value, the feature point classification device 104 classifies a corresponding feature point as a recognition reference feature point (S111). Under a condition that the feature point classification device 104 sequentially tracks a feature point extracted from a certain area of the first capture image in corresponding areas of the second capture image, the third capture image, . . . , and the nth capture image, the uncertainty about the distance to the feature point decreases from the second capture image to the nth capture image. Thus, the linearity index may become equal to or less than the predetermined threshold value at any time.

The feature point classification device 104 may not select all feature points extracted from a capture image as the recognition reference feature point, but may instead select only a feature point having distance (position) certainty equal to or greater than a certain level as the recognition reference feature point. Thus, the amount of data needed to recognize a 3D object may be reduced, thus implementing real-time augmented reality. In addition, by excluding the feature point having high distance (position) uncertainty from the recognition reference feature point, a factor that interferes with the calculation of an initial orientation of the capture device 102 may be removed in advance during a subsequent object recognition process.

Next, the feature point classification device 104 stores information regarding the feature point selected as the recognition reference feature point (S113). The feature point classification device 104 may match and store the information regarding the feature point and the object in the storage device 110. Here, the information regarding the feature point may include at least one of coordinates, a descriptor, and a linearity index of the feature point. The feature point classification device 104 may generate the coordinates of the feature point by transforming the feature point selected as the recognition reference feature point in an inverse distance coordinate system to that in a Cartesian coordinate system. The feature point classification device 104 may transform the feature point in the inverse distance coordinate system to a feature point in the Cartesian coordinate system using Equation (1).

When a result of the determination in step S109 is that a linearity index computed among feature points associated with one another through the feature point tracking is greater than the predetermined threshold value, the feature point classification device 104 classifies a corresponding feature point as a dummy feature point (S115). That is, although the feature point classification device 104 calculates the distance (position) uncertainty while sequentially tracking a feature point extracted from a certain area of the first capture image in corresponding areas of the second capture image, the third capture image, . . . , and the nth capture image, the feature point classification device 104 may classify the feature point as the dummy feature point when the distance (position) uncertainty is still high. Accordingly, it is possible to increase an object recognition ratio by separately classifying a feature point having high distance uncertainty as a dummy feature point and preventing the dummy feature point from interfering with recognition of an object during a subsequent object recognition process.

Next, the feature point classification device 104 stores information regarding the feature point that is selected as the dummy feature point (S117). The feature point classification device 104 may match and store the information regarding the feature point and the object in the storage device 110. Here, the information regarding the feature point may include at least one of a descriptor and a linearity index of the feature point.

A feature point is not extracted from a capture image at the first capture point, but the above-described steps may be performed on feature points extracted from images captured at subsequent capture points.

Next, the feature point classification device 104 subclassifies the feature points classified as the recognition reference feature point and the dummy feature point using a brightness distribution of an area in which feature points of a capture image are included (S119). The feature point classification device 104 may subclassify the feature points classified as the recognition reference feature point and the dummy feature point, through learning using a classifier.

Figure 4:
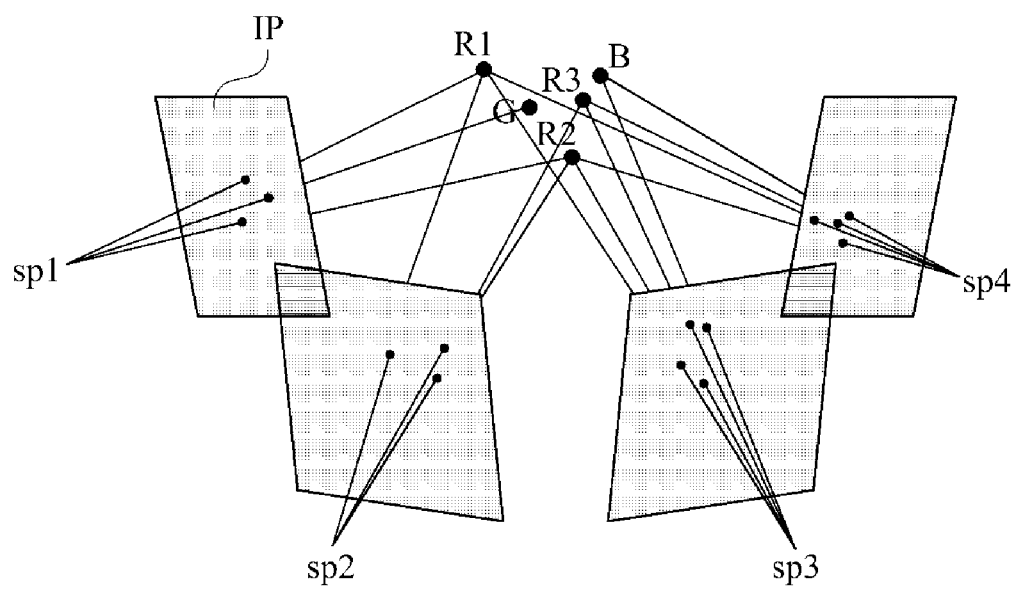
FIG. 4 is a view schematically showing an example in which a feature point classification device classifies feature points according to an exemplary embodiment.

FIG. 4 is a view schematically showing an example in which a feature point classification device classifies feature points according to an exemplary embodiment.

Referring to FIG. 4, the capture device 102 may sequentially capture an object while changing a capture point from a first capture point sp1 to a fourth capture point sp4. The feature point classification device 104 may extract a feature point of the object from each image captured at the first capture point sp1 to the fourth capture point sp4. In this case, the feature points may be projected and displayed on an image plane IP of the capture device 102.

Here, three feature points R1, G, and R2 are extracted from an image (first capture image) captured at the first capture point sp1. Three feature points R1, R2, and R3 are extracted from an image (second capture image) captured at the second capture point sp2. Four feature points R1, R2, R3, and B are extracted from an image (third capture image) captured at the third capture point sp3. Four feature points R1, R2, R3, and B are extracted from an image (fourth capture image) captured at the fourth capture point sp3.

Here, when a result of tracking the feature points R1, R2, R3, G, and B is that linearity indexes of the feature points R1, R2, and R3 are equal to or less than a threshold value and linearity indexes of the feature points G and B are greater than the threshold value, the feature point classification device 104 may classify the feature points R1, R2, and R3 as the recognition reference feature points and may classify the feature points G and B as the dummy feature points. In this case, it is possible to prevent the dummy feature point from degrading an object recognition ratio by reducing the number of feature points used for object recognition and thereby implementing real-time augmented reality.

Figure 5:
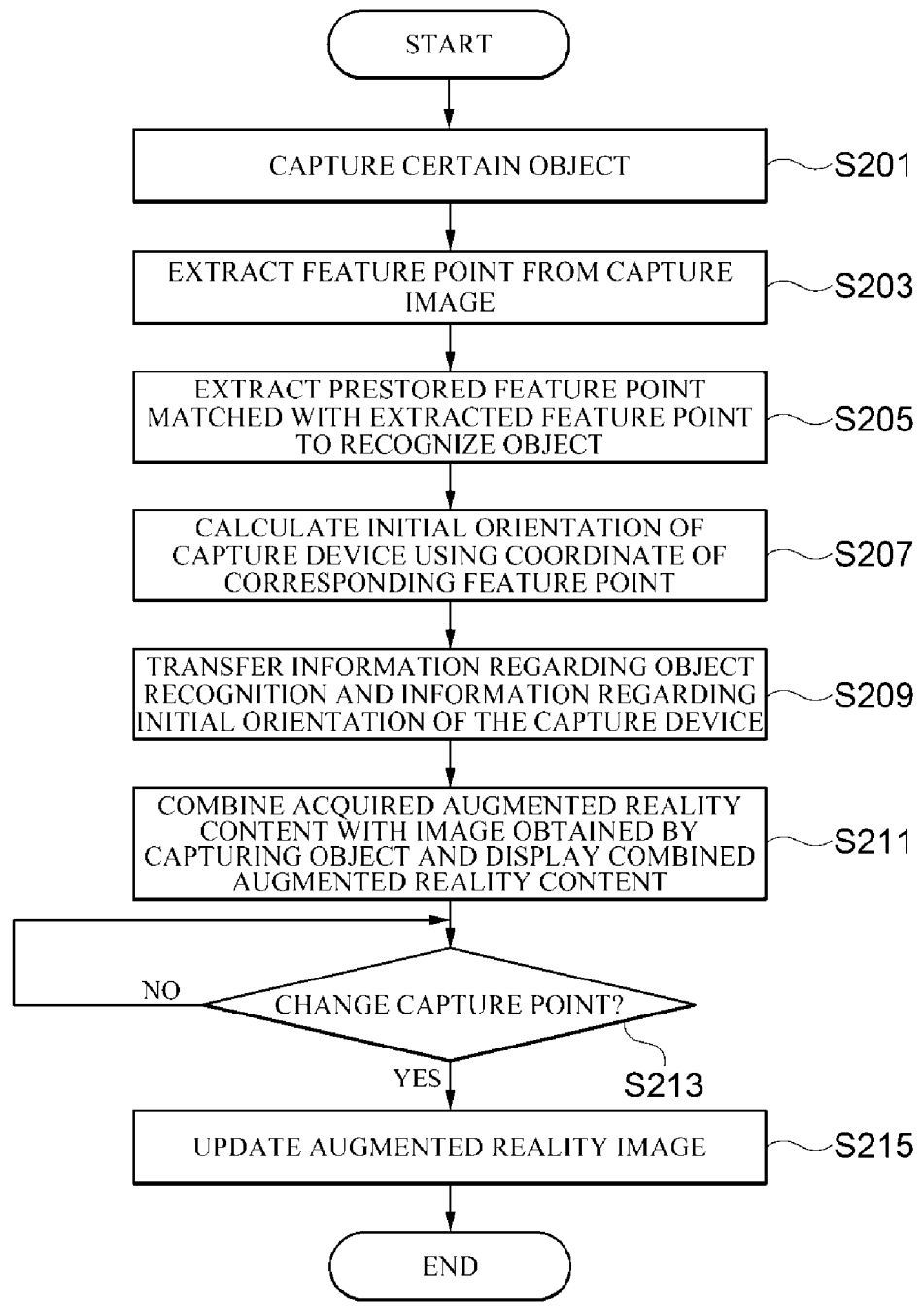
FIG. 5 is a flowchart showing a process of an augmented reality system recognizing an object and providing augmented reality content corresponding to the object according to an exemplary embodiment.

FIG. 5 is a flowchart showing a process of an augmented reality system recognizing an object and providing augmented reality content corresponding to the object according to an exemplary embodiment. In the flowchart, the method is illustrated as having a plurality of steps. However, at least some of the steps may be performed in a different order, performed in combination, omitted, performed in sub-steps, or performed in addition to one or more steps that are not shown. Furthermore, according to an embodiment, one or more steps that are not shown may be performed in addition to the method.

Referring to FIG. 5, the capture device 102 captures a certain object to generate an image including the object (S201). The image including the object may be transmitted to the object recognition device 106.

Next, a feature point is extracted from the image obtained by capturing the object, by the object recognition device 106 (S203). The object recognition device 106 may generate a feature point descriptor for the extracted feature point.

Next, the object recognition device 106 extracts a feature point matched with the extracted feature point from among feature points stored in the storage device 110 and recognizes the object (S205). That is, the object recognition device 106 may recognize the object by checking which object has the prestored feature point matched with the extracted feature point.

The object recognition device 106 may extract a feature point matched with the extracted feature point from among a recognition reference feature point group stored in the storage device 110. When the extracted feature point is matched with a feature point of a dummy feature point group stored in the storage device 110, the object recognition device 106 may recognize the extracted feature point as the dummy feature point, thereby increasing accuracy in object recognition.

Next, the object recognition device 106 extracts the coordinates of a feature point (that is, a feature point belonging to the recognition reference feature point group) matched with the extracted feature point and calculates an initial orientation (that is, an orientation of the capture device 102 when the object is captured in step S201) of the capture device 102 using the coordinates (S207). The object recognition device 106 may calculate the initial orientation of the capture device 102 using a perspective-n-point algorithm. In this case, it is possible to prevent the initial orientation of the capture device 102 from being incorrectly calculated, by excluding dummy feature points having high distance (position) uncertainty from a feature point used to calculate an initial orientation of the capture device 102.

Next, the object recognition device 106 transmits information regarding the object recognition and information regarding the initial orientation of the capture device 102 to the augmented reality display device 108 (S209). Here, the object recognition information includes information regarding which an object captured by the capture device 102 is.

Next, the augmented reality display device 108 acquires augmented reality content corresponding to the object, combines the acquired augmented reality content with the image obtained by capturing the object, and displays the combined augmented reality content (S211). In this case, the augmented reality display device 108 may adjust an orientation of the augmented reality content based on the initial orientation information of the capture device 102 and perform combining with the image obtained by capturing the object.

Next, the augmented reality display device 108 checks whether a capture point of the capture device 102 is changed (S213). The augmented reality display device 108 may check whether at least one of a capture position and a capture orientation of the capture device 102 is changed.

When a result of the check in step S213 is that the capture point of the capture device 102 has been changed, the augmented reality display device 108 re-adjusts the orientation of the augmented reality content according to the changed capture point and updates the augmented reality image (image obtained by combining the augmented reality content with the image obtained by capturing the object) (S215).

Figure 6:
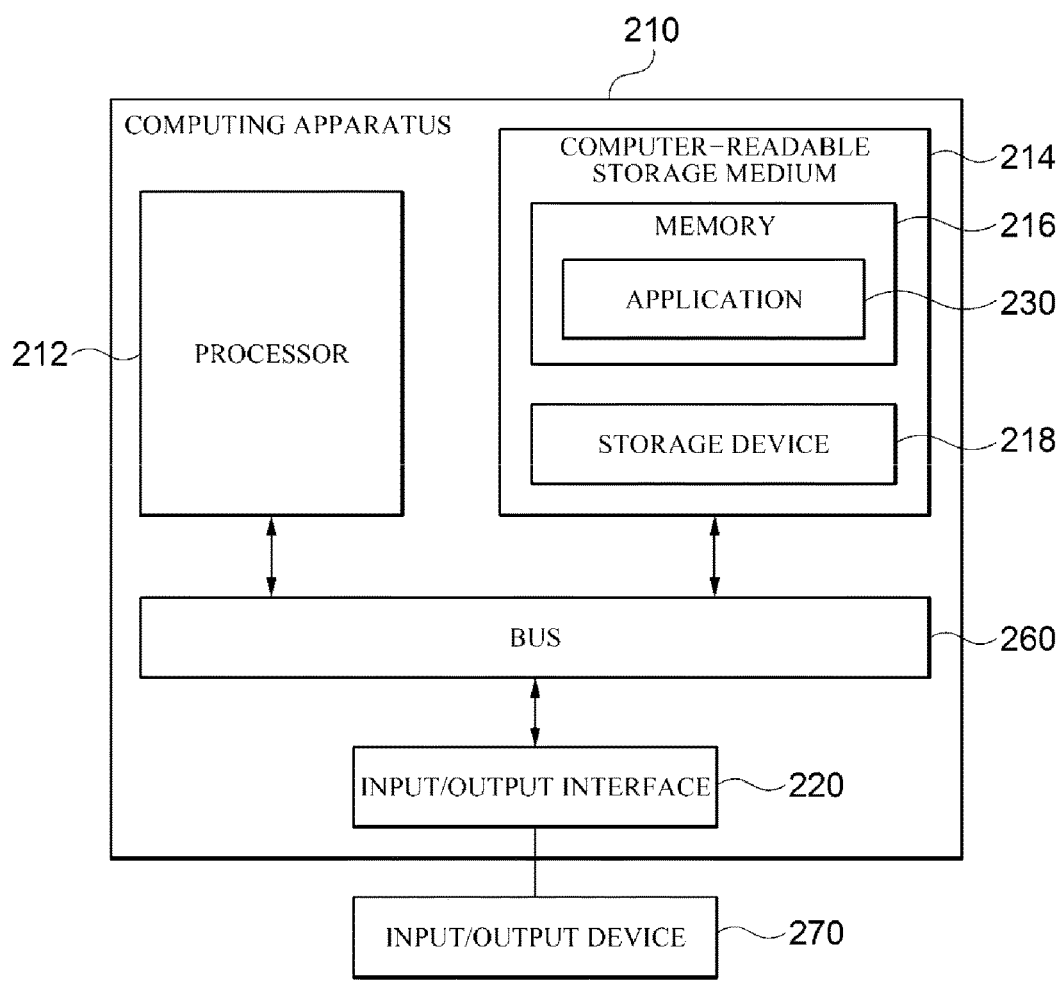
FIG. 6 is a view showing a computing environment including an exemplary computing apparatus appropriate for use with the exemplary embodiments.

FIG. 6 is a view showing a computing environment including an exemplary computing apparatus appropriate for use with the exemplary embodiments.

An exemplary computing environment 200 shown in FIG. 6 includes a computing apparatus 210. Typically, different configurations may have different functions and capabilities and may further include an appropriate component although not described below. The computing apparatus 210 may be an apparatus (e.g., the feature point classification device 104) that is used to classify feature points. The computing apparatus 210 may be an apparatus (e.g., the object recognition device 106) that is used to recognize an object. The computing apparatus 210 may be an apparatus (e.g., the augmented reality display device 108) that is used to output an augmented reality image.

The computing apparatus 210 includes at least one processor 212, a computer-readable storage medium 214 and a bus 260. The processor 212 is connected with the bus 260, and the bus 260 connects various other components, such as the computer-readable storage medium 214, of the computing apparatus 210 to the processor 212.

The processor 212 allows the computing apparatus 210 to operate according the above-described exemplary embodiment. For example, the processor 212 may execute computer executable instructions stored in the computer-readable storage medium 214. When executed by the processor 212, the computer executable instructions stored in the computer-readable storage medium 214 may be configured to allow the computing apparatus 210 to perform operations according to an exemplary embodiment.

The computer-readable storage medium 214 is configured to store a computer executable instruction or program code (e.g., an instruction included in an application 230), program data (e.g., data used by the application 230), and/or any other suitable form of information. The application stored in the computer-readable storage medium 214 includes a certain set of instructions executable by the processor 212.

A memory 216 and a storage device 218 shown in FIG. 6 are examples of the computer-readable storage medium 214. A computer executable instruction that can be executed by the processor 212 may be loaded to the memory 216. In addition, program data may be stored in the memory 216. For example, the memory 216 may be a volatile memory such as a random access memory (RAM), non-volatile memory, or a combination thereof. As another example, the storage device 218 may include one or more removable or non-removable components for storing information. For example, the storage device 218 may be a hard disk, a flash memory, a magnetic disk, an optical disk, any other form of a storage medium that can be accessed by the computing apparatus 210 to store desired information, or a combination thereof.

The computing apparatus 210 may include at least one input/output interface 220 that provides an interface for at least one input/output device 270. The input/output interface 220 is connected to the bus 260. The input/output device 270 may be connected to the computing apparatus 210 (or its other components) through the input/output interface 220. The input/output device 270 may include an input device, such as a pointing device, a keyboard, a touch input device, a voice input device, a sensor device, and/or a capture device and an output device, such as a display device, a printer, a speaker, and/or a network card.

Embodiments of the present disclosure may include a computer-readable storage medium including a program for performing methods described in this specification on a computer. The computer-readable storage medium may include a program instruction, a local data file, a local data structure, or a combination thereof. The computer-readable storage medium may be designed and configured only for the present disclosure. Examples of the computer-readable storage medium include a magnetic medium, such as a hard disk, a floppy disk, and a magnetic tape, an optical recording medium, such as a CD-ROM and a DVD, a magneto-optical medium, such as a floptical disk, and a hardware device specially configured to store and perform a program instruction, such as a ROM, a RAM, and a flash memory. Examples of the program instruction include a high-level language code executable by a computer with an interpreter, in addition to a machine language code made by a compiler.

According to an exemplary embodiment, it is possible to reduce an amount of data to be processed during an object recognition process and thus implement augmented reality in real time by extracting feature points from an image obtained by capturing an object that is subject to an augmented reality service and classifying the extracted feature points as a recognition reference feature point or a dummy feature point according to position uncertainty.

In addition, by separately classifying a feature point having high distance uncertainty as the dummy feature point, it is also possible to prevent a dummy feature point from decreasing an object recognition ratio and prevent an initial orientation of the capture device from being inaccurately calculated.

Furthermore, by excluding a feature point extracted from an area, in which the same or similar pattern is repeated, of a capture image from among tracking targets, it is also possible to prevent in advance a corresponding feature point from interfering with tracking or recognition of other feature points and reduce an amount of data to be processed.

Although exemplary embodiments of the disclosure has been described in detail, it will be understood by those skilled in the art that various changes may be made without departing from the spirit or scope of the disclosure. Thus, the scope of the present disclosure is to be determined by the following claims and their equivalents, and shall not be restricted or limited by the foregoing detailed description.

What is claimed is:

1. An apparatus comprising:
one or more processors;
a memory; and
one or more programs,
wherein the one or more programs are stored in the memory and configured to be executed by the one or more processors, the one or more programs comprising instructions for:
extracting feature points from a plurality of images captured while changing a capture point such that at least one of a capture position and a capture orientation is changed;
tracking feature points extracted from the same area of the plurality of images to associate the tracked feature points with one another;
calculating uncertainty about a position of the associated feature points;
classifying the associated feature points according to the position uncertainty;
extracting feature points from an image obtained by a capture device capturing a certain object;
extracting prestored feature points matched with the extracted feature points to recognize the object;
acquiring augmented reality content corresponding to the recognized object; and
combining the acquired augmented reality content with the image obtained by capturing the object to display the combined augmented reality content;
wherein the position uncertainty is calculated according to a linearity index computed among the associated feature points of the plurality of images; and
the classifying of the feature points comprises:
classifying the associated feature points as a recognition reference feature point group when the linearity index is equal to or less than a predetermined threshold value and
classifying the associated feature points as a dummy feature point group when the linearity index is greater than the predetermined threshold value.

2. The apparatus of claim 1, wherein the method further comprises calculating coordinates of the feature points classified as the recognition reference feature point group.

3. The apparatus of claim 1, wherein the tracking of feature points to associate the tracked feature points with one another comprises excluding feature points extracted from an area, in which the same or similar pattern is repeated, of the plurality of images from among tracking targets.

4. A method for displaying augmented reality content, comprising:
extracting, by a feature point classification device, feature points from a plurality of images captured while changing a capture point such that at least one of a capture position and a capture orientation is changed;
tracking, by the feature point classification device, feature points extracted from the same area of the plurality of images to associate the tracked feature points with one another;
calculating, by the feature point classification device, uncertainty about a position of the associated feature points;
classifying and storing, by the feature point classification device, the associated features as a recognition reference feature point group or a dummy feature point group according to the position uncertainty;
extracting, by an object recognition device, feature points from an image obtained by a capture device capturing a certain object;
extracting, by the object recognition device, prestored feature points matched with the extracted feature points to recognize the object;
acquiring, by an augmented reality display device, augmented reality content corresponding to the recognized object; and
combining, by the augmented reality display device, the acquired augmented reality content with the image obtained by capturing the object to display the combined augmented reality content;

wherein the position uncertainty is calculated according to a linearity index computed among the associated feature points of the plurality of images; and the classifying and storing of the associated features comprises:

classifying the associated feature points as the recognition reference feature point group when the linearity index is equal to or less than a predetermined threshold value; and classifying the associated feature points as the dummy feature point group when the linearity index is greater than the predetermined threshold value.

5. The method of claim 4, wherein information regarding coordinates of each feature point belonging to the recognition reference feature point group is prestored, and the extracting, by the object recognition device, of prestored feature points matched with the extracted feature points to recognize the object comprises:

extracting, by the object recognition device, the feature points matched with the extracted feature points from among the recognition reference feature point group; and extracting, by the object recognition device, coordinates of the feature points extracted from among the recognition reference feature point group to calculate an initial orientation of the capture device using the extracted coordinates.

6. The method of claim 5, wherein the combining, by the augmented reality display device, of the acquired augmented reality content with the image obtained by capturing the image to display the combined augmented reality content comprises: adjusting, by the augmented reality display device, an orientation of the augmented reality content using an initial orientation of the capture device to combine the augmented reality content with the image obtained by capturing the object.

7. The method of claim 6, further comprising, after the combining, by the augmented reality display device, of the acquired augmented reality content with the image obtained by capturing the image to display the combined augmented reality content: readjusting, by the augmented reality display device, an orientation of the augmented reality content according to the changed capture point when the capture point of the capture device is changed.

8. A system comprising:

a capture device that captures an image of the object by a camera;

an object recognition device that extracts feature points from an image obtained by the capture device capturing the object and extracts prestored feature points matched with the extracted feature points to recognize the object;

an augmented reality display device acquires augmented reality content corresponding to the recognized object, combines the augmented reality content with the image obtained by capturing the object, and displays the combined augmented reality content; and a feature point classification device that extracts feature points from a plurality of images captured while changing a capture point such that at least one of a capture position and a capture orientation is changed for each object, tracks feature points extracted from the same area of the plurality of images to associate the tracked feature points with one another, and classifies and stores the associated features points according to uncertainty about a position of the associated feature points;

wherein the position uncertainty is calculated according to a linearity index computed among the associated feature points of the plurality of images; and the feature point classification device classifies the associated feature points as a recognition reference feature point group when the linearity index is equal to or less than a predetermined threshold value and classifies the associated feature points as a dummy feature point group when the linearity index is greater than the predetermined threshold value.

9. The system of claim 8, wherein information regarding coordinates of each feature point belonging to the recognition reference feature point group is prestored, and the object recognition device extracts the feature points matched with the extracted feature points from among the recognition reference feature point group, extracts coordinates of the feature points extracted from among the recognition reference feature point group, and calculates an initial orientation of the capture device using the extracted coordinates.

10. The system of claim 9, wherein the augmented reality display device adjusts an orientation of the augmented reality content using an initial orientation of the capture device to combine the augmented reality content with the image obtained by capturing the object and readjusts the orientation of the augmented reality content as a capture point of the capture device is changed.

11. A computer program stored in a non-transitory computer readable medium to perform in combination with hardware:

extracting feature points from a plurality of images captured while changing a capture point such that at least one of a capture position and a capture orientation is changed;

tracking feature points extracted from the same area of the plurality of images to associate the tracked feature points with one another;

calculating uncertainty about a position of the associated feature points;

classifying the associated features according to the position uncertainty;

extracting feature points from an image obtained by a capture device capturing a certain object; and extracting prestored feature points matched with the extracted feature points to recognize the object;

acquiring augmented reality content corresponding to the recognized object; and combining the acquired augmented reality content with the image obtained by capturing the object to display the combined augmented reality content;

wherein the position uncertainty is calculated according to a linearity index computed among the associated feature points of the plurality of images; and the classifying of the feature points comprises:

classifying the associated feature points as a recognition reference feature point group when the linearity index is equal to or less than a predetermined threshold value; and classifying the associated feature points as a dummy feature point group when the linearity index is greater than the predetermined threshold value.

* * * * *